R. LUPLOW.
COMBINATION AUTOMATIC AUTOMOBILE LOCK.
APPLICATION FILED JUNE 17, 1919.

1,327,601.

Patented Jan. 6, 1920.
3 SHEETS—SHEET 1.

INVENTOR
RONALD LUPLOW.
BY Hazard & Miller
ATTORNEYS.

R. LUPLOW.
COMBINATION AUTOMATIC AUTOMOBILE LOCK.
APPLICATION FILED JUNE 17, 1919.
1,327,601.
Patented Jan. 6, 1920.
3 SHEETS—SHEET 2.
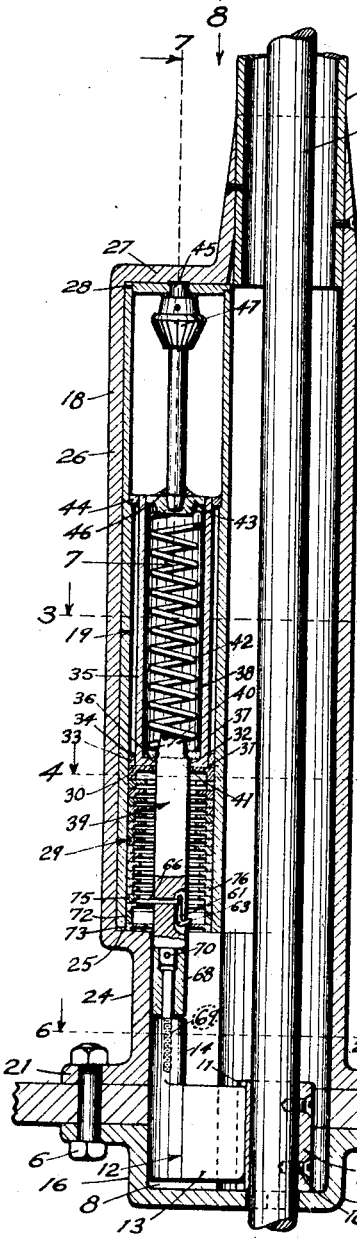
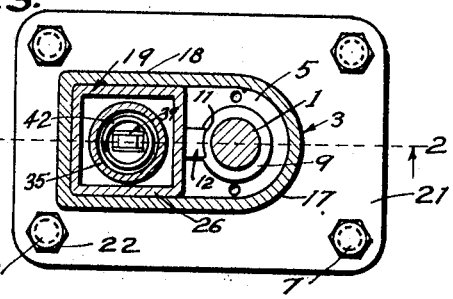
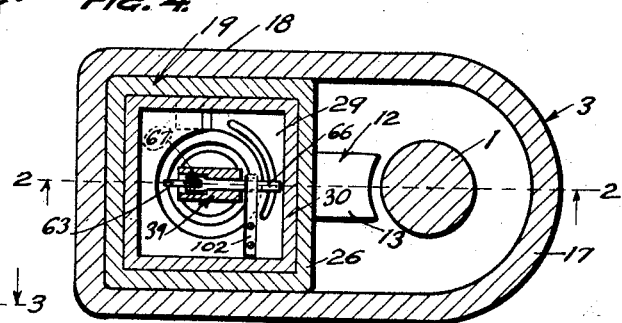
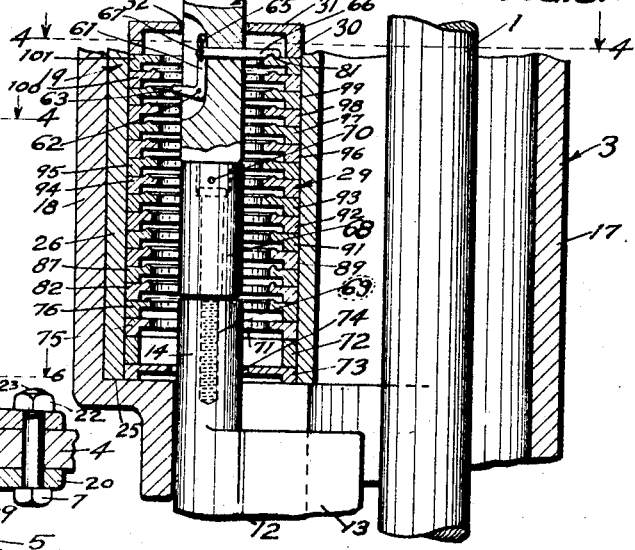
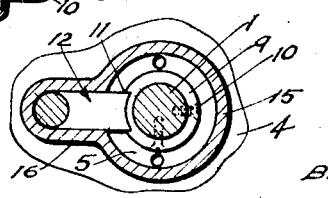
INVENTOR.
RONALD LUPLOW.
BY Hazard & Miller
ATTORNEYS

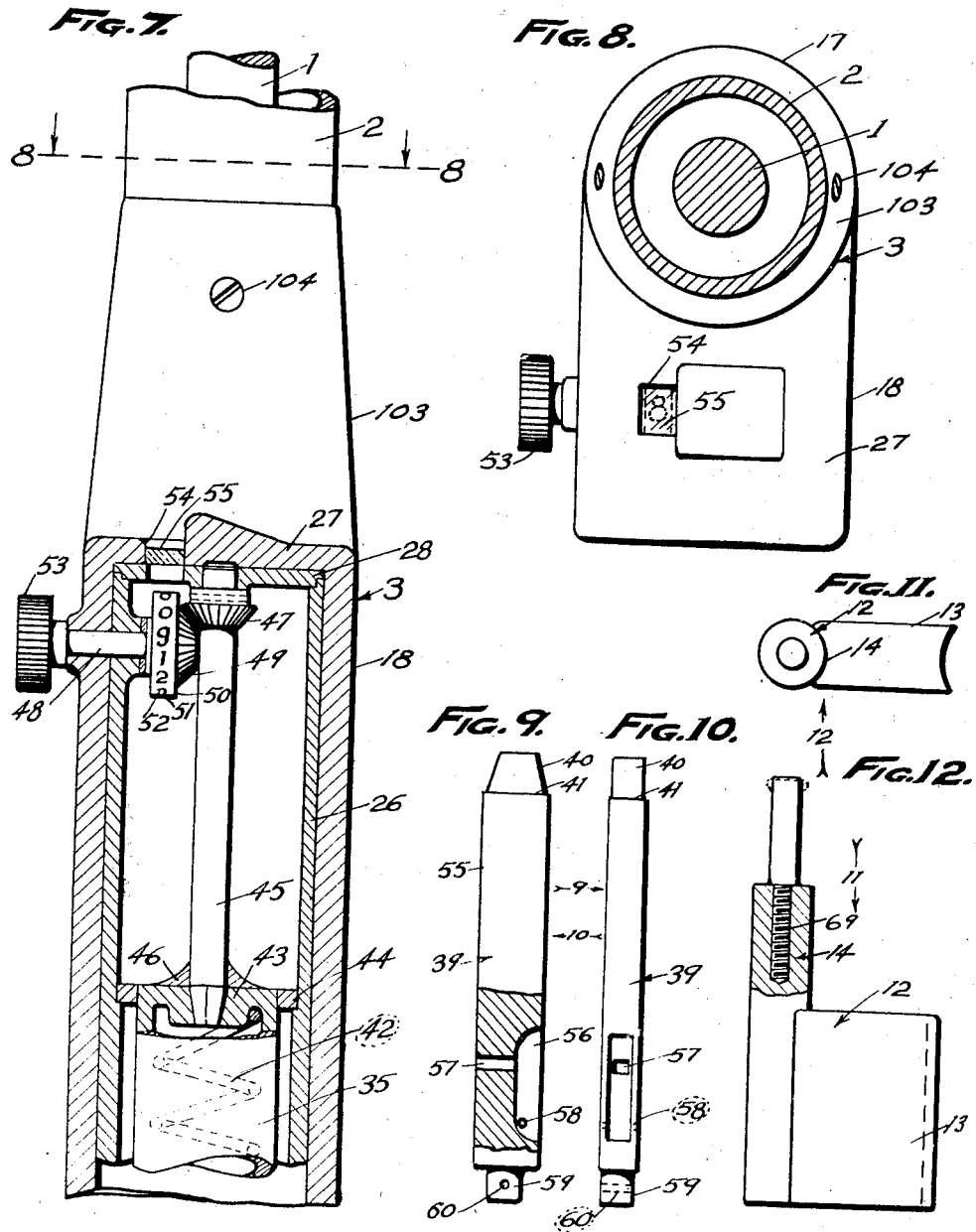

UNITED STATES PATENT OFFICE.

RONALD LUPLOW, OF PHOENIX, ARIZONA.

COMBINATION AUTOMATIC AUTOMOBILE-LOCK.

1,327,601.   Specification of Letters Patent.   Patented Jan. 6, 1920.

Application filed June 17, 1919. Serial No. 304,940.

*To all whom it may concern:*

Be it known that I, RONALD LUPLOW, a citizen of the United States, residing at Phoenix, in the county of Maricopa and State of Arizona, have invented new and useful Improvements in Combination Automatic Automobile-Locks, of which the following is a specification.

My object is to make a combination automatic automobile lock and my invention consists of the novel features herein shown, described and claimed.

Figure 1 is a fragmentary perspective showing a combination automatic automobile lock embodying the principles of my invention applied to a steering post of an automobile.

Fig. 2 is an enlarged fragmentary sectional detail of the steering post and a combination automatic automobile lock applied to the steering post, the view being taken longitudinally of the steering wheel shaft, and the view being taken on the lines 2—2 of Figs. 3 and 4 and looking in the direction indicated by the arrows.

Fig. 3 is a cross section on the line 3—3 of Fig. 2 and looking downwardly as indicated by the arrows.

Fig. 4 is an enlarged cross section on the lines 4—4 of Figs. 2 and 5.

Fig. 5 is an enlarged fragmentary longitudinal sectional detail on the same plane as Fig. 2 and showing the parts in different positions.

Fig. 6 is a cross sectional detail on the line 6—6 of Fig. 2 and looking in the direction indicated by the arrow, the view being made upon a reduced scale relative to Figs. 4 and 5.

Fig. 7 is an enlarged fragmentary longitudinal sectional detail on the line 7—7 of Fig. 2.

Fig. 8 is a cross section on the line 8—8 of Fig. 7 and looking downwardly as indicated by the arrow.

Fig. 9 is a side elevation of the combination operating member removed from the combination and made upon an enlarged scale, the view being taken looking in the direction indicated by the arrow 9 in Fig. 10 and parts being shown in section.

Fig. 10 is a side elevation looking in the direction indicated by the arrow 10 in Fig. 9.

Fig. 11 is a top plan view of the movable locking dog looking in the direction indicated by the arrow 11 in Fig. 12.

Fig. 12 is a side elevation looking in the direction indicated by the arrow 12 in Fig. 11.

Fig. 13 is a diagrammatic view showing the combination plates laid side by side.

Fig. 14 is an enlarged plan view of one of the combination plates as seen looking in the direction indicated by the arrow 14 in Fig. 15.

Fig. 15 is a cross section on the line 15—15 of Fig. 14.

Fig. 16 is a top plan view of a combination plate used with the combination shown in Fig. 14, the view being taken looking in the direction indicated by the arrow 16 in Fig. 17.

Fig. 17 is a cross section on the line 17—17 in Fig. 16.

Fig. 18 is an enlarged sectional detail of the spring and spring casing.

Fig. 19 is a top plan view looking in the direction indicated by the arrow 19 in Fig. 18.

Fig. 20 is a bottom plan view looking in the direction indicated by the arrow 20 in Fig. 18.

Figs. 21 and 22 are views analogous to Figs. 16 and 17 and showing left handed instead of right handed combination plates.

Figs. 23 and 24 are views analogous to Figs. 14 and 15 and showing left handed instead of right handed combination plates.

Figs. 25 and 26 are views analogous to Figs. 23 and 24 and showing the addition of a throw off lug.

The steering post shaft 1 extends through the steering post casing 2 and through the lock casing 3 and through the foot board 4, and through the extension lock casing 5. The extension lock casing 5 is fitted against the lower front face of the foot board 4 and secured in place by bolts 6 and 7. The extension lock casing 5 has a chamber 8 around the steering post shaft 1.

A rigid locking dog 9 has a cylindrical sleeve fitting closely upon the steering post shaft 1 and secured in place by cap screws 10 and has a longitudinally extending slot 11 to receive a movable locking dog 12, so that when the movable locking dog 12 is in the slot 11 the steering post shaft 1 cannot be rotated.

The movable locking dog comprises a solid rectangular block 13 and a stem 14 extending upwardly from the block 13 in line with the outer edge of the block.

The extension casing 5 has a cylindrical portion 15 in which the rigid locking dog 9 operates and a neck 16 in which the movable locking dog 12 operates, said neck 16 being shaped to allow the locking dog 12 to move in a plane parallel with the steering post shaft 1 and to hold the dog from rotating or moving laterally as required to hold the steering post shaft 1 locked.

The lock casing 3 has a semicircular portion 17 forming an extension of the steering post casing 2 and a rectangular portion 18 extending laterally from the portion 17 and forming a housing for the lock mechanism 19. The portion 18 of the lock casing 3 is in line with the portion 16 of the extension casing 5.

A flange 20 extends outwardly all the way around the lock casing 5 and a mating flange 21 extends outwardly all the way around the lower end of the casing 3 and the bolts 6 and 7 extend through the flange 20, through the mating flange 21 and nuts 22 are applied and the bolts riveted to form heads 23 to hold the nuts from being removed. Of course, the lock mechanism 19 is made up and placed in the casing before the nuts 22 are applied.

The lock casing 3 has a neck portion 24 matching with the nut portion 16 of the extension casing, so that the movable locking dog 12 will move upwardly to a point above the upper end of the rigid locking dog 9. The rectangular portion 18 of the lock casing 3 is larger than the neck portion 24, thus forming a seat 25 around the upper end of the neck portion 24 and at the bottom of the rectangular portion 18.

A combination container 26 is rectangular in cross section and fits closely in the rectangular portion 18 between the shoulder 25 and the head 27, said container 26 being open at the lower end and closed at the upper end by a cap 28.

The combination plates 29 are mounted in the lower end of the container 26 and rest upon the shoulder 25. The combination plates 29 are square in plan and fit closely in the container 26, a spacing band 30 is mounted on top of the combination plates 29, a bearing plate 31 is mounted on the spacing band 30 and has a circular central opening 32 and a second bearing plate 33 is mounted on top of the bearing plate 31, said bearing plates 31 and 33 being square in plan, the opening through the bearing plate 31 being comparatively small and the opening 34 through the bearing 33 being larger, and both of said openings 32 and 34 being circular.

The spring casing 35 is circular and fits in the opening 34 and has a closely fitting head forming a spring seat support 36 fitting upon the bearing plate 31 around the opening 32. The spring seat 37 fits upon the spring seat support 36 in the spring chamber 38.

The combination operating member 39 extends freely through the combination plates 29 and through the bearing plate 31 and through the spring seat support 36 and has a tapered end 40 and a supporting shoulder 41. The tapered upper end 40 is flat one way and fits in the opening in the spring seat 37 with the spring seat 37 resting upon the shoulder 41.

The opening through the spring seat support 36 is flat to fit the flat member 39, so that the member 39 will not rotate in the spring seat support 36, and so that the member 39 may go up and down through the spring seat support 36 and not through the spring seat 37.

The expansive coil spring 42 is mounted in the chamber 38 against the spring seat 37. A head 43 is fixed in the upper end of the spring casing 35 against the spring 42 and a bearing plate 44 fits in the container 26 and has a central opening in which the spring casing 35 rotates.

A shaft 45 has a rectangular lower end fitting in a socket 46 at the center of the head 43 and the shaft extends upwardly and is journaled in the head 28. A bevel pinion 47 is fixed upon the upper end of the shaft 45 below the head 28. A dial shaft 48 is mounted through the wall of the container 26 and through the wall of the rectangular portion 18 of the casing 3.

A bevel gear 49 is fixed upon the inner end of the dial shaft 48 and meshes with the pinion 47 and a dial wheel 50 is fixed upon the shaft against the bevel gear 49 and has a flat periphery 51 carrying graduations 52 and forming the indicating dial. A hand wheel 53 is fixed upon the outer end of the dial shaft 48 for manipulating the dial.

An opening 54 is formed through the heads 27 and 28 and a transparent glass plate 55 is fixed in the opening so that the indications 52 may be read through the plate 55 for working the combinations.

The details of the combination operating member 39 are shown in Figs. 9 and 10. The body 55 is straight from the shoulder 41 downwardly and rectangular in cross section. A recess 56 is formed in one of the narrow sides near the lower end and a bore 57 extends from the upper part of the recess 56 straight through the body.

A pin hole 58 is formed through the body crosswise of the recess 56 near its lower end. A lug 59 extends downwardly from the end of the body and has a transverse pin hole 60.

Referring to the Figs. 2 and 5, a bell crank lever 61 is mounted in the recess 56 and held pivotally in place by a pin 62 inserted through the pin hole 58 and through the angle of the lever. A short arm 63 of the bell crank lever is substantially horizontal and a long arm 64 is substantially vertical, there being a vertical slot 65 through the upper end of the long arm 64.

A combination selecting finger 66 is slidingly mounted through the bore 57 and slidingly connected to the arm 64 by a pin 67 inserted through the end of the finger and through the slot 55. A swivel head 68 is connected to the stem 14 by a screw 69 inserted downwardly loosely through the head 68 and tapped into the stem 14 so that the head will rotate freely.

The lug 59 extends into the upper end of the head 68 and is connected to the head by a pin 70 inserted through the head 68 and through the pin hole 60, so that when the hand wheel 53 is operated in either direction the combination operating member 39 carrying the combination selecting finger 66 will be rotated.

The combination plates 29 have central openings 71 large enough to allow the arm 63 to pass freely up and down and to allow the finger 66 to pass freely up and down when the finger is moved inwardly to tilt the bell crank lever 61 to swing the long arm 64 to the left, as in Fig. 5, and the finger 66 is long enough so that when the bell crank lever 61 is vertical, as in Fig. 5 the outer end of the finger 66 will not pass up and down through the openings 71.

A spacing band 72 is placed below the combination plates 29 and a stop plate 73 is placed below the spacing band 72, the opening 74 in the stop plate being small enough to prevent the long arm 63 of the bell lever from passing downwardly below the stop plate, so that when the parts are in position as shown in Fig. 5 with the outer end of the finger 66 resting on the combination plates 29 and something happens, as the misworking of the combinations, to push the finger 66 to the left until the finger will pass through the opening 71, then the tension of the spring 42 will push the movable locking dog 13 downwardly until the short arm 63 of the bell crank lever 61 strikes the stop plate 73, and then the movable locking dog 13 will engage the rigid locking dog 9 and the steering post shaft 1 is locked and cannot be unlocked without working the combinations to cause the finger 66 to find its way back to the top of the combination plates 29.

The details of the combination plates 29 are as follows:

When the combination finger 66 is moved inwardly and the member 39 drops to lock the dogs 13 and 9 together the arm 63 strikes the stop plate 73 and the finger 66 is extended over the combination plate 75 and under the combination plate 76. The combination plate 75 is a smooth rectangular plate having a central opening 71.

The combination plate 76 is shown in detail in Figs. 16 and 17 and comprises a rectangular plate having a central opening 71, a recess 77 formed from its lower face, a rib 78 upon its upper face, a slot 79 extending from the recess 77 to the upper face, and an inclined shifting tongue 80 at the lower side of the slot 79. The combination plate 76 fits flat upon the combination plate 75 and the finger 66 operates in the recess 77 and if the hand wheel 53 is operated in the right direction the finger 66 will pass up the tongue 80 through the slot 79 to the top of the combination.

A groove 81 in the lower face of the outer end of the finger 66 fits the head 78. Proper manipulation will cause the finger 66 to pass to the top of the combination plate 76 and then further manipulation will cause the finger 66 to pass to the top of the combination 82.

The combination plate 82 is shown in detail in Figs. 23 and 24 and consists of a flat plate fitting upon the combination plate 76 and having a central opening 71 and a recess 83 in its lower face and a slot 84 extending from its lower face to its upper face, there being a left handed pivoted tongue 85 bearing upon the combination plate 76 to guide the finger 66 upwardly through the slot 84. The combination plate 76 is provided with a throw off lug 86. The throw off lug 86 extends upwardly and inwardly from the upper face to the edge of the opening 71 so that if the combination is operated to bring the finger 66 against the throw off lug 86, the finger will be pressed inwardly and will fall to the starting place. The throw off lug 86 has an inclined or curved inner face to serve as a cam to press the finger 81 inwardly. If the combination is properly worked the finger 66 will pass up the pivoted transfer tongue 85 to the top of the combination plate 82.

Further proper manipulation of the combination operating hand wheel 53 will cause the finger 66 to pass to the top of the combination plate 87. The combination plate 87 is shown in detail in Figs. 21 and 22 and is the same as the combination plate 76 except that it has a left handed transfer tongue 88 and the throw off lug 86 is omitted. Proper manipulation will cause the finger 66 to pass to the top of the combination plate 89.

The combination plate 89 is shown in detail in Figs. 23 and 24 and is the same as the combination plate 82. Proper manipulation will cause the finger 66 to pass to the top of the combination plate 91.

The combination plate 91 is the same as the combination plate 87 with the throw off lug 86 added. Proper manipulation will cause the finger 66 to pass to the top of the combination plate 92. The combination plate 92 is the same as the combination plate 89 except that the transfer tongue is turned to a different quarter. Proper manipulation will cause the finger 66 to pass to the top of the combination 93 which is the same as the combination plate 76. Then the finger will pass to the combination plate 94 which is the same as the combination plate 82 with the transfer slot in a different quarter and the throw off lug 86 added. The combination plate 94 is shown in detail in Figs. 25 and 26.

Continued manipulation of the handwheel 53 will cause the finger to pass to the top of the combination plate 95, then to the top of the combination plate 96, then to the top of the combination plate 97, then to the top of the combination plate 98, then to the top of the combination plate 99, then to the top of the combination plate 100, and then to the top of the combination plate 101, and the steering shaft 1 is unlocked and free to operate the automobile.

A spring catch 102 is provided upon the combination plate 101 to hold the finger 66 steady during the operation of the vehicle. In assembling the combinations a record is kept of the mix up of the combinations and this record is read upon the dial 51 as the hand wheel 53 is manipulated to work out the combination.

Any mis-working of the combination from start to finish will cause the combination to drop and the work must start from the beginning again.

The combination plates 95, 97 and 99 are the same as plate 92, the combination plates 96 and 98 are the same as plate 92, and the combination plates 100 and 101 are the same as plate 76.

There are four distinct forms of combinations. The combination plates 76 and 87 are the same except that the transfers are right and left handed, making two combination plates and the combination plates 82 and 89 are the same except that the transfer tongues are right and left handed thus making four combinations. Then the combinations are square and of course have four quarters and each combination may be changed to four different positions and in making up the stack of combination plates 29 the four different forms of combinations may be mixed in any desired way and turned to any desired quarter.

This makes it necessary to thoroughly understand the reading of the combinations and to manipulate the hand wheel with great accuracy because every mismove of the combination will return the combination finger to the starting point.

A socket 103 extends upwardly from the lock casing 3 and the lower end of the steering post casing 2 is fitted into the socket 103 and secured in place by cap screws 104 and preferably soldered or brazed.

It is obvious that the lock thus constructed and applied cannot be easily picked or unlocked by unauthorized persons.

It is thought that the operation is obvious from the foregoing description and drawings.

Various changes may be made without departing from the spirit of my invention as claimed.

I claim:

1. A combination automatic automobile lock comprising a lock casing forming an extension of the steering post casing around the steering wheel shaft, a locking dog fixed upon the steering wheel shaft in the lock casing, a movable locking dog mounted for reciprocation longitudinally of the axis of the shaft and adapted to lock with the rigid locking dog and operating bar swiveled to the movable locking dog for rotation, a finger pivoted to the operating bar and projecting laterally, and a series of mixable combination plates mounted in the lock casing around the operating bar and forming a tortuous up passage for the finger, and means for throwing the finger out of the up passage into the down passage.

2. A combination automatic automobile lock comprising a lock casing forming an extension of the steering post casing around the steering wheel shaft, a locking dog fixed upon the steering wheel shaft in the lock casing, a movable locking dog mounted for reciprocation longitudinally of the axis of the shaft and adapted to lock with the rigid locking dog, an operating bar swiveled to the movable locking dog for rotation, a finger pivoted to the operating bar and projecting laterally, and a series of mixable combination plates mounted in the lock casing around the operating bar and forming a tortuous up passage and a straight down passage for the finger, means for throwing the finger out of the up passage into the down passage, a bell crank lever mounted upon the operating bar and connected to the finger, and means at the bottoms of the passages for operating the bell crank lever for throwing the finger back into the up passage.

3. A combination automatic automobile lock comprising a lock casing forming an extension of the steering post casing around the steering wheel shaft, a locking dog fixed upon the steering wheel shaft in the lock casing, a movable locking dog mounted for reciprocation longitudinally of the axis of the shaft and adapted to lock with the rigid locking dog, an operating bar swiveled to the movable locking dog for rotation, a finger pivoted to the operating bar and projecting laterally, and a series of mixable combination plates mounted in the lock casing around the operating bar and forming a tortuous up passage for the finger and a straight down passage for the finger, and means on some of the combination plates for throwing the finger out of the up passage into the down passage.

4. In a combination lock, a casing having a square chamber and a series of mixable combination plates stacked one upon the other in the chamber, said mixable combination plates being square so as to fit into the chamber in any one of four ways, and said mixable combination plates forming a tortuous up passage, and a straight down passage.

5. In a combination lock, a casing forming a straight square chamber and a series of mixable combination plates stacked upon each other in the chamber, said combination plates being made right and left and inserted in any one of four ways, and forming a tortuous up passage and a straight down passage.

6. In a combination lock, a casing forming a straight square chamber, a series of mixable combination plates stacked in the chamber and forming a tortuous up passage and a straight down passage, an operating bar slidingly and rotatably mounted in the straight down passage, a finger carried by the operating bar and adapted to follow the up passage and raise the operating bar, means for moving the finger out of the tortuous up passage into the straight down passage, and a spring for throwing the operating bar downwardly in the straight passage.

In testimony whereof I have signed my name to this specification.

RONALD LUPLOW.